United States Patent [19]

Oshima

[11] Patent Number: 5,554,683
[45] Date of Patent: Sep. 10, 1996

[54] VINYL CHLORIDE RESIN ELASTOMER COMPOSITION

[75] Inventor: Masabumi Oshima, Nagoya, Japan

[73] Assignee: Mitsubishi Chemical MKV Company, Tokyo, Japan

[21] Appl. No.: 414,203

[22] Filed: Mar. 31, 1995

[30] Foreign Application Priority Data

| Apr. 1, 1994 | [JP] | Japan | 6-064843 |
| Oct. 24, 1994 | [JP] | Japan | 6-258265 |

[51] Int. Cl.$^6$ .......... C08L 27/06; C08L 67/02; C08K 5/11; C08K 5/12

[52] U.S. Cl. .......... 524/569; 524/141; 524/143; 524/145; 524/292; 524/296; 524/297; 524/298; 524/314; 524/522; 524/114; 524/523; 524/527; 525/166

[58] Field of Search .......... 524/141, 143, 524/145, 292, 296, 297, 298, 314, 522, 569, 114, 523, 527; 525/166

[56] References Cited

U.S. PATENT DOCUMENTS 4,518,515  5/1985  Ott et al. .......... 525/79
5,416,146  5/1995  Kushida et al. .......... 524/297

FOREIGN PATENT DOCUMENTS

| 0101899 | 3/1984 | European Pat. Off. . | |
| 0298208 | 1/1989 | European Pat. Off. . | |
| 2650258 | 5/1978 | Germany | 525/166 |
| 56-115342 | 9/1981 | Japan . | |
| 0010153 | 1/1987 | Japan | 524/298 |
| 1-256554 | 10/1989 | Japan . | |
| 0151645 | 6/1990 | Japan | 524/297 |

*Primary Examiner*—Peter A. Szekely
*Attorney, Agent, or Firm*—Oblon, Spivak, McClelland, Maier & Neustadt, P.C.

[57] ABSTRACT

A vinyl chloride resin elastomer composition comprising, as main components, 100 parts by weight of a vinyl chloride resin, from 10 to 200 parts by weight of an acrylic rubber containing a tetrahydrofuran-insoluble cross-linking component, from 1 to 50 parts by weight of an acrylic resin and from 30 to 300 parts by weight of a plasticizer.

12 Claims, No Drawings

VINYL CHLORIDE RESIN ELASTOMER COMPOSITION

The present invention relates to a vinyl chloride resin elastomer composition excellent in compression set, creep resistance, weather resistance, tear strength and thermal aging resistance, which is useful for gaskets, for which airtight sealing properties are required, for example, for application to automobiles, such as weather strips, glass runs, packings for trunks or roofmoles, or for application to electrical equipments or buildings, such as packings or joint filling materials.

With respect to elastomer materials, there has been an increasing demand for improvement of their properties year by year. Particularly, in the field of automobiles, excellent compression set is demanded for materials of e.g. glass runs and weather strips.

Heretofore, soft vinyl chloride resins have been widely used as such materials, since they have flexible rubber-like texture and they are superior to vulcanized rubber in the moldability, weather resistance and tinting properties, and they have an advantage also from the viewpoint of costs. However, they are inferior to vulcanized rubber in the compression set, and their softening point is low, whereby their application for use at high temperatures has been limited. Under these circumstances, an attempt has been made for improvement by modifying the vinyl chloride resins to have high degrees of polymerization, but no satisfactory results have been obtained.

A technique of improving the compression set by adding a partially cross-linked acrylonitrile-butadiene rubber (hereinafter referred to as NBR) is disclosed, for example, in Japanese Unexamined Patent Publications No. 115342/1981 and No. 187341/1982. However, such a technique employs NBR as the rubber component and thus has a drawback that the composition is poor in the weather resistance and is not durable for use for a long period of time.

The above-mentioned Japanese Unexamined Patent Publication No. 115341/1981 discloses use of an acrylic rubber, and Japanese Unexamined Patent Publication No. 256554/1989 discloses a composition comprising a vinyl chloride resin, an acrylic rubber containing a component insoluble in tetrahydrofuran (hereinafter referred to as THF), and a plasticizer, for the purpose of improving a high temperature shape-maintaining property and weather resistance. However, such a composition has had drawbacks that, when used for a long period of time, it is poor in the thermal aging resistance, and the tear strength is low, since the plasticizer is one commonly used, and no acrylic resin is incorporated.

The present inventors have conducted an extensive research with an aim to obtain a composition excellent in thermal aging resistance and tear strength without impairing compression set, creep resistance and weather resistance with an elastomer composition comprising, as the main components, a vinyl chloride resin, a rubber material and a plasticizer. As a result, they have found it possible to accomplish the above object with a composition having an acrylic rubber containing a THF-insoluble cross-linking component, an acrylic resin and a plasticizer having a relatively high weight average molecular weight incorporated to a vinyl chloride resin. The present invention has been accomplished on the basis of this discovery.

Namely, it is an object of the present invention to provide a vinyl chloride resin elastomer composition excellent in various physical properties such as compression set, creep resistance, weather resistance, thermal aging resistance and tear strength.

The present invention provides a vinyl chloride resin elastomer composition comprising, as main components, 100 parts by weight of a vinyl chloride resin, from 10 to 200 parts by weight of an acrylic rubber containing a tetrahydrofuran-insoluble cross-linking component, from 1 to 50 parts by weight of an acrylic resin and from 30 to 300 parts by weight of a plasticizer, and a method for its production.

Now, the present invention will be described in detail.

The vinyl chloride resin as the main resin component of the elastomer composition of the present invention may be any resin produced by subjecting vinyl chloride, or a mixture of vinyl chloride with a comonomer copolymerizable therewith to a conventional polymerization method such as suspension polymerization, bulk polymerization, microsuspension polymerization or emulsion polymerization. The comonomer may, for example, be a vinyl ester such as vinyl acetate, vinyl propionate or vinyl laurate, an acrylic acid ester such as methyl acrylate, ethyl acrylate or butyl acrylate, a methacrylic acid ester such as methyl methacrylate or ethyl methacrylate, a maleic acid ester such as dibutyl maleate or diethyl maleate, a fumaric acid ester such as dibutyl fumarate or diethyl fumarate, a vinyl ether such as vinyl methyl ether, vinyl butyl ether or vinyl octyl ether, a vinyl cyanide such as acrylonitrile or methacrylonitrile, an α-olefin such as ethylene, propylene or styrene, a vinylidene halide or vinyl halide other than vinyl chloride, such as vinylidene chloride or vinyl bromide, or a polyfunctional monomer such as diallylphthalate or ethylene glycol dimethacrylate. The comonomer is of course not restricted to the above specific examples. The comonomer is used in an amount of not more than 30% by weight, preferably not more than 20% by weight, in the constituting components of the vinyl chloride resin.

The average polymerization degree of the vinyl chloride resin is not particularly limited, but is preferably within a range of from 700 to 8,000, more preferably from 1,000 to 4,000, most preferably from 1,300 to 3,500, from the viewpoint of processability and moldability.

The acrylic rubber contained in the elastomer composition of the present invention is a synthetic rubber containing an acrylic acid ester such as an alkyl acrylate or an alkoxyalkyl acrylate, as the main component. Such a synthetic rubber includes in its scope a copolymer comprising an acrylic acid derivative as the main component which is copolymerized with a functional monomer such as an alkyl methacrylate, acrylonitrile or a styrene. The acrylic rubber is required to contain a cross-linking component insoluble in tetrahydrofuran (THF). It preferably contains at least 30 wt %, preferably at least 50 wt %, of the cross-linking component. To introduce the cross-linking component to the acrylic rubber, a cross-linkable monomer such as divinylbenzene, ethylene glycol diacrylate, ethylene glycol dimethacrylate, propylene glycol diacrylate or propylene glycol dimethacrylate, may, for example, be reacted. If the amount of the THF-insoluble cross-linking component is small, the compression set property of the elastomer composition tends to be poor.

The amount of the acrylic rubber is selected usually within a range of from 10 to 200 parts by weight, preferably from 20 to 150 parts by weight, most preferably from 30 to 120 parts by weight, per 100 parts by weight of the vinyl chloride resin. If the amount of the acrylic rubber is less than 10 parts by weight, the effect to improve the compression set tends to be small, and if it exceeds 200 parts by weight, deterioration of the physical properties such as tear strength, elongation and thermal aging resistance, tends to be substantial.

The above THF-insoluble cross-linking component is determined in such a manner that 0.5 g of the acrylic rubber is introduced into 30 ml of THF with stirring, left to stand at 23° C. for 24 hours to dissolve a THF-soluble component, and then subjected to filtration by means of a glass fiber filter paper. The insoluble residue is dried, and the dried weight is determined, whereupon the content of the cross-linking component is calculated.

The plasticizer to be used for the elastomer composition of the present invention is not particularly limited. However, its weight average molecular weight is preferably at least 430. With a plasticizer having a weight average molecular weight (MW) of less than 430, the effect of improving the tear strength is low, and the thermal aging resistance tends to be poor for an extended period of time. Such a plasticizer may, for example, be a plasticizer of a phthalic acid ester of a higher alcohol such as di-2-ethylhexyl phthalate (MW391), diisononyl phthalate (MW418), diisodecyl phthalate (MW447) or diundecyl phthalate (MW475), a phosphoric acid ester plasticizer such as tris(2-ethylhexyl) phosphate (MW435) or trisdichloropropyl phosphate (MW431), an adipic acid ester plasticizer such as di-2-ethylhexyl adipate (MW370) or dibutyl diglycol adipate (MW435), a trimellitic acid ester plasticizer such as tri(2-ethylhexyl)trimellitate (MW547), or a polyester plasticizer obtained by esterifying an aliphatic dibasic acid such as adipic acid, sebacic acid or azelaic acid, or an aromatic dibasic acid such as phthalic acid, with an aliphatic glycol such as 1,2-propanediol, 1,2-butanediol, 1,3-butandiol, 1,4-butandiol, 2,2-dimethyl-1,3-propanediol, 1,6-hexanediol, 1,8-octanediol or trimethylhexanediol. Among such plasticizers, a polyester plasticizer, or a mixture of a polyester plasticizer with other plasticizers, is preferred. The polyester plasticizer should preferably have a weight average molecular weight of up to 8,000, more preferably from 1,000 to 5,000, particularly preferably from 1,000 to 2,000.

It is also possible to use an epoxy fatty acid ester (MW400 to 500) or an epoxidized oil plasticizer (MW about 1,000) in combination.

The amount of the plasticizer varies depending upon the type and the amount of the vinyl chloride resin or the acrylic rubber, the presence or absence of the filler. However, it is usually selected within a range of from 30 to 300 parts by weight, preferably from 40 to 200 parts by weight, per 100 parts by weight of the vinyl chloride resin.

The acrylic resin to be incorporated to the elastomer composition of the present invention means a resin obtained by polymerization of acrylic acid or its derivative, and it may, for example, be a polymer or a copolymer of e.g. acrylic acid, an acrylic acid ester, acrylamide, acrylonitrile, methacrylic acid or a methacrylic acid ester. For the elastomer composition of the present invention, it is particularly preferred to use a copolymer of methyl methacrylate with an alkyl acrylate, wherein the methyl methacrylate is at least 60% by weight, preferably from 70 to 90% by weight, and the alkyl acrylate is at most 40% by weight, preferably from 10 to 30% by weight. The acrylic resin is incorporated within a range of from 1 to 50 parts by weight, preferably from 3 to 30 parts by weight, per 100 parts by weight of the vinyl chloride resin. If the amount of the acrylic resin is less than 1 part by weight, the effect of improving the tear strength of the elastomer composition tends to be small, and if it exceeds 50 parts by weight, the composition tends to be hard, and the elasticity tends to be lost, although such may depend also on the type and the amount of the plasticizer.

It is preferred to incorporate a filler to the elastomer composition of the present invention to such an extent not to impair the compression set or other physical properties. The filler has a function to absorb an excess amount of a plasticizer and to facilitate the kneading and molding. The filler may, for example, be carbon black, calcium carbonate, titanium oxide, talc, aluminum hydroxide, magnesium hydroxide, hydrotalcite, clay, silica or white carbon. The filler is incorporated usually within a range of not more than 150 parts by weight, preferably from 10 to 100 parts by weight, per 100 parts by weight of the vinyl chloride resin. If the amount of the filler is too small, the effect of improving the kneading and molding properties tends to be small. On the other hand, if it exceeds 150 parts by weight, the moldability tends to be poor, and it is advisable to incorporate the filler within a range not to impair the moldability also from the economical viewpoint.

Further, various additives such as a stabilizer, a lubricant, an antioxidant, an ultraviolet absorber, a blowing agent, a flame retardant, a pigment, an impact resistance-improving agent, and a thermoplastic resin and a rubber other than those mentioned above, may be added to the elastomer composition of the present invention, as the case requires.

As such a thermoplastic resin and a rubber, a methyl methacrylate-butadiene-styrene rubber (MBS), an acrylic rubber (AR) soluble in THF, a butadiene rubber (BR), a styrene-butadiene rubber (SBR), an acrylonitrile-butadiene-styrene rubber (ABS), an isoprene rubber (IR), a chloroprene rubber (CR), an ethylene-propylene rubber (EPR), an ethylene-vinyl acetate copolymer (EVA), a thermoplastic polyurethane (TPU) and nylon may, for example, be mentioned.

The vinyl chloride resin elastomer composition of the present invention can be prepared by a method which comprises introducing predetermined amounts of the vinyl chloride resin, the acrylic rubber containing the THF-insoluble cross-linking component, the plasticizer and the acrylic resin as well as various additives such as a filler into a mixer or a kneader and mixing and kneading the components uniformly under heating at a temperature of from 100° to 230° C., preferably from 130° to 230° C. From the operational viewpoint or with a view to obtaining a uniformly kneaded composition, it is preferred to prepare the elastomer composition of the present invention, for example, by the following method. Namely, a blend comprising the respective components such as the vinyl chloride resin, the acrylic resin and the plasticizer other than the acrylic rubber, is preliminarily dry-blended, and then the dry-blended product and the acrylic rubber containing the THF-insoluble cross-linking component are mixed and kneaded under heating at a temperature of from 100° to 230° C. After the kneading, the kneaded composition is usually formed into pellets by a sheet cutting method or a hot cutting method, and such pellets are supplied to the next step of molding. Other additives such as a filler may, of course, be incorporated at the time of mixing and kneading the acrylic rubber. If the mixing and kneading temperature is lower than 100° C. it takes a long time for kneading, whereby the productivity tends to be poor. On the other hand, if it is higher than 230° C., the elastomer composition tends to be decomposed.

An apparatus to be used for mixing the above blend components, may be any apparatus so long as it is capable of uniformly mixing them. For example, it may be a Henschel mixer, a ribbon blender or a planetary mixer. To knead the mixture, an apparatus capable of kneading it under a shearing force under heating, such as an extruder, a roll mill, a Banbury mixer or a kneader, can be used. To prepare the elastomer composition, it is preferred to employ a closed type kneader such as a Banbury mixer, an intensive mixer or a pressure kneader, or an equidirectional twin-screw extruder in view of the greater kneading effects.

The elastomer composition thus prepared is continuously extruded in a continuous length with a profile by a profile extrusion machine such as an extruder to form a gasket or the like. The cross-sectional shape is not particularly limited, and may be any desired shape, for example, a T-shape, an L-shape, an F-shape, an E-shape or a hollow shape, or a combination of these shapes.

Further, the above composition may be combined with a metal or a hard resin to form a composite gasket. The hard resin may, for example, a chlorinated vinyl chloride resin, a hard vinyl chloride resin, or an acrylonitrile-butadiene-styrene resin. The metal may, for example, be iron, steel, stainless steel, brass or aluminum. As a method for combining the vinyl chloride resin elastomer composition with a hard material such as a metal or a hard resin, it is possible to employ a method wherein the vinyl chloride resin elastomer composition is extruded and coated over the entire surface or a part of the surface of the hard material of a strip shape, a plate shape or a rod shape, a method wherein the both materials are co-extruded by means of a plurality of extruders, and they are combined in an extruding die or in the vicinity thereof, or a method wherein the two materials are formed into molded products by various molding methods, and the molded products are bonded by heat fusion or by means of an adhesive.

Now, the present invention will be described in further detail with reference to Examples. However, it should be understood that the present invention is by no means restricted by such specific Examples.

Evaluation of the quality of the vinyl chloride resin elastomer compositions and gaskets were conducted as follows, and the results are shown in Table 1.

Compression set: Measured in accordance with JIS K6301 at 70° C. for 22 hours under a compression of 25%.

Tear strength: Measured in accordance with JIS K6301.

Weather resistance test: An elastomer composition was formed into a sheet by a roll mill, and from the sheet, a press sheet was prepared. Then, test specimens of 5 cm×5 cm were punched out and subjected to a weather resistance test, whereby the weather resistance was evaluated by the color difference before and after the weather resistance test. The weather resistance test conditions and the color difference measurement conditions were as follows.

Weather resistance test conditions

Sunshine Weather Meter (manufactured by Suga Shikenki) was used.

Black panel: 83° C.

Spray cycle: 60 min/12 min (water spray for 12 minutes in 60 minutes)

Period of time: 450 hours.

Color difference measuring conditions

Photometer AUCOLOR VP-1 (manufactured by Kurashiki Boseki) was used. Light was irradiated to the surface of a test specimen, and the reflected light was measured by a spectrophotometer. The difference in the intensity of the reflected light from the surface of the test specimen before and after the test was taken as the color difference. The greater the numerical value, the greater the color change.

Elongation: Measured in accordance with JIS K6723.

Thermal aging resistance: In accordance with JIS K6723, elongation after thermal aging under a heating condition of 100° C. for 500 hours, was measured, and the elongation remaining ratio was determined by the following formula.

Elongation remaining ratio (%)=elongation after aging/ elongation before aging)×100

Gasket deformation ratio: In accordance with JIS K6301, the deformation ratio of a gasket having a length of 5 cm was measured under a condition of 70° C. for 22 hours under a compression of 50%.

EXAMPLES 1 to 8 and COMPARATIVE EXAMPLES 1 to 5

Preparation of compositions

To 100 parts by weight of a vinyl chloride resin having an average polymerization degree of 2,350, a plasticizer and an acrylic resin of the types and the amounts (parts by weight) as identified in Table 1, as well as 3 parts by weight of a Ba-Zn type composite stabilizer, 1 part by weight of a phosphite type chelator, 0.4 part by weight of a lubricant, 1 part by weight of an ultraviolet absorber and 30 parts by weight of calcium carbonate were mixed in a beaker, and an acrylic rubber or NBR of the type and the amount as identified in Table 1, was further added and mixed thereto. The mixture was kneaded by a 8 inch mill roll at a surface temperature of 160° C. for 5 minutes. From a roll sheet obtained by the kneading, a press sheet was prepared, from which test specimens were punched out.

Preparation of a gasket

A roll sheet prepared as described above, was pelletized by a sheet cut method. Pellets were extruded by a 20 mm$_ɸ$ extruder to obtain a molded product of a tubular shape having an outer diameter of 16.5 mm and an inner diameter of 13.5 mm.

The tubular molded product was bonded on a stainless steel plate having a thickness of 1 mm to obtain a gasket.

TABLE 1

|  |  | Examples | | | | | | | |
| --- | --- | --- | --- | --- | --- | --- | --- | --- | --- |
|  |  | 1 | 2 | 3 | 4 | 5 | 6 | 7 | 8 |
| Plasti- | Phthalic acid type 1 | 100 |  |  |  |  |  |  |  |
| cizer | Polyester type 1 |  | 100 |  |  |  |  |  |  |
|  | Polyester type 2 |  |  | 100 | 100 | 50 |  |  |  |
|  | DOP |  |  |  |  | 50 | 100 |  |  |
|  | DINP |  |  |  |  |  |  | 100 | 50 |
|  | Adipic acid type 1 |  |  |  |  |  |  |  | 50 |
| Acrylic resin |  | 10 | 10 | 10 | 5 | 10 | 10 | 10 | 10 |
| Rubber | Acrylic rubber 1 | 50 | 50 | 50 | 50 | 50 | 50 | 50 | 50 |
|  | Acrylic rubber 2 |  |  |  |  |  |  |  |  |
|  | NBR |  |  |  |  |  |  |  |  |

TABLE 1-continued

| | | | | | | | | |
|---|---|---|---|---|---|---|---|---|
| Gasket deformation ratio (%) | 45 | 47 | 48 | — | 47 | 46 | — | 46 |
| Compression set (%) | 47 | 48 | 49 | 49 | 48 | 47 | 48 | 47 |
| Tear strength (kg/cm) | 26 | 26 | 29 | 28 | 27 | 23 | 23 | 23 |
| Color difference | 2.6 | 2.6 | 2.7 | 2.7 | 2.6 | 2.7 | 2.7 | 2.7 |
| Elongation before aging (%) | 315 | 320 | 320 | 315 | 320 | 315 | 310 | 305 |
| Elongation remaining ratio after aging (%) | 95 | 98 | 98 | 98 | 96 | 55 | 75 | 65 |

| | | Comparative Examples | | | | |
|---|---|---|---|---|---|---|
| | | 1 | 2 | 3 | 4 | 5 |
| Plasticizer | Phthalic acid type 1 | | | | | |
| | Polyester type 1 | | | | | |
| | Polyester type 2 | | 100 | 100 | 100 | |
| | DOP | 100 | | | | 100 |
| | DINP | | | | | |
| | Adipic acid type 1 | | | | | |
| Acrylic resin | | | 10 | 10 | 10 | 10 |
| Rubber | Acrylic rubber 1 | 50 | | | | 300 |
| | Acrylic rubber 2 | | 50 | | | |
| | NBR | | | 50 | | |
| Gasket deformation ratio (%) | | 45 | 78 | 46 | 58 | — |
| Compression set (%) | | 46 | 83 | 47 | 60 | 32 |
| Tear strength (kg/cm) | | 20 | 25 | 29 | 35 | 8 |
| Color difference | | 2.8 | 2.6 | 48.8 | 2.0 | 2.7 |
| Elongation before aging (%) | | 310 | 800 | 420 | 400 | 90 |
| Elongation remaining ratio after aging (%) | | 54 | 95 | 96 | 95 | 65 |

The materials in Table 1 used in the Examples are as follows.

Plasticizer

Phthalic acid type 1: MW452, phthalic acid dialkyl ester (alkyl groups: mixture of $C_{9-11}$)

Polyester type 1: MW1300, polyester of adipic acid with butanediol (terminal: 2-ethylhexanol)

Polyester type 2: MW1800, polyester of adipic acid with butanediol (terminal: 2-ethylhexanol)

DOP: Di-2-ethylhexyl phthalate (MW391)

DINP: Diisononyl phthalate (MW418)

Adipic acid type 1: MW387, adipic acid dialkyl ester (alkyl groups: mixture of $C_{7-11}$)

Acrylic resin Methyl methacrylate/alkyl acrylate=70 to 90/30 to 10 wt %

Rubber material

Acrylic rubber 1: THF-insoluble cross-linking component: 93.9 wt % (prepared)

Acrylic rubber 2: THF-insoluble cross-linking component: nil (commercial product)

NBR: THF-insoluble cross-linking component: 89.4 wt %

Acrylonitrile content: 30 wt %

The vinyl chloride resin elastomer composition of the present invention comprises a vinyl chloride resin, an acrylic rubber containing a THF-insoluble cross-linking component, an acrylic resin and a plasticizer, particularly a plasticizer having a weight average molecular weight of at least 430, whereby it is excellent in thermal aging resistance and tear strength, and when compared with a vinyl chloride resin elastomer containing cross-linked NBR, it has equivalent physical properties with respect to the compression set, creep resistance, moldability, bleed resistance, blocking resistance and low temperature flexibility. Thus, it can be used as a material for not only extrusion molding but also calender processing, injection molding, inflation molding or compression molding, whereby a molded product having an optional or predetermined shape can be obtained.

The vinyl chloride resin elastomer composition of the present invention is useful in a wide range of industrial, automobile and building applications, for example, for weather strips, glass runs, packings, gaskets, hoses, sheets, grips, rolls, grommets, duct boots and cushion materials.

I claim:

1. A vinyl chloride resin elastomer composition consisting essentially of, as main components, 100 parts by weight of a vinyl chloride resin, from 10 to 200 parts by weight of an acrylic rubber, from 1 to 50 parts by weight of an acrylic resin and from 30 to 300 parts by weight of a plasticizer, wherein said acrylic rubber is a copolymer of (1) an acrylic acid ester alone or combined with another functional monomer, which is at least partially cross-linked with (2) a difunctional cross-linking monomer to form a tetrahydrofuran-insoluble rubber component, and wherein said acrylic resin is a polymer or copolymer of at least one of acrylic acid, an acrylic acid ester, acrylamide, acrylonitrile, methacrylic acid and a methacrylic acid ester.

2. The vinyl chloride resin elastomer composition according to claim 1, wherein the average polymerization degree of the vinyl chloride resin is within a range of from 700 to 8,000.

3. The vinyl chloride resin elastomer composition according to claim 1, wherein the acrylic rubber contains at least 30 wt % of the tetrahydrofuran-insoluble rubber component.

4. The vinyl chloride resin elastomer composition according to claim 1, wherein the weight average molecular weight of the plasticizer is at least 430.

5. The vinyl chloride resin elastomer composition according to claim 1, wherein the plasticizer is a polyester plasticizer.

6. The vinyl chloride resin elastomer composition according to claim 5, wherein the weight average molecular weight of the plasticizer is within a range of from 1,000 to 8,000.

7. The vinyl chloride resin elastomer composition according to claim 1, which further contains a filler.

8. A method for producing a vinyl chloride resin elastomer composition, which comprises mixing and kneading at a temperature of from 100° to 230° C. a blend consisting essentially of 100 parts by weight of a vinyl chloride resin, from 10 to 200 parts by weight of an acrylic rubber, from 1 to 50 parts by weight of an acrylic resin and from 30 to 300 parts by weight of a plasticizer, wherein said acrylic rubber is a copolymer of (1) an acrylic acid ester alone or combined with another functional monomer, which is at least partially cross-lined with (2) a difunctional cross-linking monomer to form a tetrahydrofuran-insoluble rubber component, and wherein said acrylic resin is a polymer or copolymer of at least one of acrylic acid, an acrylic acid ester, acrylamide, acrylonitrile, methacrylic acid and a methacrylic acid ester.

9. The method for producing a vinyl chloride resin elastomer composition according to claim 8, wherein a filler is present during the mixing and kneading.

10. The method for producing a vinyl chloride resin elastomer composition according to claim 8, wherein a blend comprising the blend components other than the acrylic rubber, is dried up, and then the acrylic rubber is mixed and kneaded therewith.

11. A gasket of a continuous length with a profile formed of a vinyl chloride resin elastomer composition consisting essentially of, as main components, 100 parts by weight of a vinyl chloride resin, from 10 to 200 parts by weight of an acrylic rubber, from 1 to 50 parts by weight of an acrylic resin and from 30 to 300 parts by weight of a plasticizer, wherein said acrylic rubber is a copolymer of (1) an acrylic acid ester alone or combined with another functional monomer, which is at least partially cross-linked with (2) a difunctional cross-linking monomer to form a tetrahydrofuran-insoluble rubber component, and wherein said acrylic resin is a polymer or copolymer of at least one of acrylic acid, an acrylic acid ester, acrylamide, acrylonitrile, methacrylic acid and a methacrylic acid ester.

12. The gasket according to claim 11, wherein the profile is a T-shape, an L-shape, an F-shape, an E-shape or a hollow shape.

* * * * *